United States Patent [19]
Field-Richards
[11] 3,842,351
[45] Oct. 15, 1974

[54] CONFERENCE CIRCUITS FOR DELTA-MODULATED DIGITAL TELECOMMUNICATIONS SYSTEMS

[75] Inventor: Hugh Sherwood Field-Richards, Ringwood, England

[73] Assignee: The Secretary of State for Defence in Her Brittanic Majesty's Government of the United Kingdom of Great Britain and Northern Ireland, Whitehall, London, England

[22] Filed: Mar. 26, 1973

[21] Appl. No.: 344,580

[30] Foreign Application Priority Data

Mar. 27, 1972 Great Britain .................... 14238/72

[52] U.S. Cl. .............................. 325/38 B, 332/11 P
[51] Int. Cl. .......................................... H03k 13/22
[58] Field of Search ...... 179/15 BW, 15 AP, 50, 68; 325/38 R, 38 B; 332/11 B; 173/50, 68; 340/347 A.347 D

[56] References Cited

UNITED STATES PATENTS

| | | | |
|---|---|---|---|
| 3,059,228 | 10/1962 | Beck et al. | 179/15 AP |
| 3,091,664 | 5/1963 | Tyrlick | 179/15 AP |
| 3,492,432 | 1/1970 | Schimpf | 179/15 AP |

*Primary Examiner*—Benedict V. Safourek
*Attorney, Agent, or Firm*—Cushman, Darby & Cushman

[57] ABSTRACT

A signal combiner, for combining a plurality of delta-modulation encoded representations of analogue signals to form an equivalent of a delta-modulation encoded representation of a combination of the analogue signals, which includes a plurality of concurrently operative slope detector circuits each arranged to derive an output signal representing a slope of a separate one of the analogue signals from a comparison of two or more consecutive bit signals in its delta-modulation encoded representation, a summing circuit connected to receive the output of the slope detector circuits and to derive an output dependent on the sum of the slopes represented by the said output signals, and a pulse generating pulse sequences to form a stream of signals equivalent to a delta-modulation encoded representation of an analogue signal having a slope indicated by the current output of the summing circuit.

5 Claims, 5 Drawing Figures

CONFERENCE CIRCUITS FOR DELTA-MODULATED DIGITAL TELECOMMUNICATIONS SYSTEMS

Figure 1:
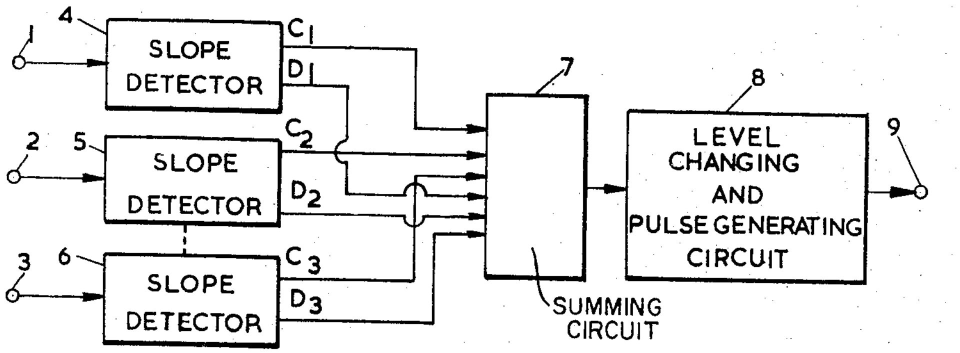

The pulse generator circuit is constructed to produce a series of ones, a series of zeros, or a series of alternating ones and zeros, dependent upon whether the output of the summing circuit indicates an increasing, decreasing or zero slope respectively.

The present invention relates to conference circuits for use with digital telecommunications systems using delta-modulation.

When a number of subscribers to a line communication system hold a conference, each subscriber needs to be able to speak and to listen to the others, and even if more than one subscriber is speaking at once at least some degree of intelligibility is required for those who are listening. This requires that the speech signals must be combined in the system without becoming unduly distorted.

When the speech signals are transmitted in analogue form throughout the communications system there is negligible distortion as the signal currents combine additively in the common line. However, when a delta-modulated pulse code communication system forms the link between the subscribers, the encoded signals cannot be directly combined and still give a meaningful result. This is because each 1 or 0 bit signal of a delta-modulator output has little meaning in itself as the 1 or 0 derives its significance from the preceding bit signals.

One method of combining delta-modulated signals from a number of subscribers for a conference connection is to decode each separate modulated signal to analogue form, combine all the decoded signals additively, and then re-encode the combined signal and apply it to the subscribers receiving lines. The decoding and re-encoding process introduces additional noise into the combined signal and may in certain circumstances severely degrade the quality of the received speech signals.

It is an object of the present invention to provide a signal combiner for delta-modulated signals which does not require the signals to be decoded and then reencoded.

According to the present invention a signal combiner, for combining a plurality of delta-modulation encoded representations of analogue signals to form an equivalent of a delta-modulation encoded representation of a combination of the analogue signals, includes a plurality of concurrently operative slope detector circuits each arranged to derive an output signal representing a slope of a separate one of the analogue signals from a comparison of two or more consecutive bit-signals in its delta-modulation encoded representation, a summing circuit connected to receive the output signals of the slope detector circuits and to derive an output dependent on the sum of the slopes represented by the said output signals, and a pulse generating circuit controlled by the output of the summing circuit for generating pulse sequences to form a stream of signals equivalent to a delta-modulation encoded representation of an analogue signal having a slope indicated by the current output of the summing circuit.

The slope of an analogue signal at any moment in time is its rate of change in value at that moment. An approximation to the slope of an analogue signal may be obtained by comparing two or more consecutive bit-signals in its delta-modulation encoded representation.

The invention makes use of the principle that a signal formed by summing a plurality of analogue signals will have a slope equivalent to the sum of the individual slopes of said plurality of signals, if the slopes are determined concurrently. In a bit stream of a delta-modulation encoded representation of an analogue waveform, according to any known form of delta-modulation, successive ones represent an increasing slope, successive zeros indicate a decreasing slope, and alternate ones and zeros indicate a zero or negligible slope.

Preferably each slope detector is arranged to compare consecutive bit-signals in a delta-modulation encoded representation of an analogue signal and to provide a signal indicating a positive slope if both bit signals are ones, to provide a signal indicating a negative slope if both bit signals are zeros, and to provide a signal indicating a zero slope if the bit signals are complementary. The summing circuit may derive an output signal indicative of the algebraic sum of the outputs of the slope detector circuits, when outputs indicating increasing, decreasing and zero slopes are assigned the values unity positive, unity negative and zero respectively. Alternatively the summing circuit may derive an output signal indicating an increasing slope if a greater number of the slope detectors indicate the presence of signals with increasing slope than those with a decreasing slope, a decreasing slope if the outputs of the slope detectors indicate the presence of a greater number of signals with a decreasing slope than those with an increasing slope, and zero slope if the outputs of the slope detectors indicate an equal number of signals having increasing and decreasing slopes.

TABLE I

| A | B | C |
|---|---|---|
| +1 | +1 | +1 |
| +1 | −1 | 0 |
| −1 | +1 | 0 |
| −1 | −1 | −1 |
| +1 | 0 | +1 |
| −1 | 0 | −1 |
| 0 | +1 | +1 |
| 0 | −1 | −1 |
| 0 | 0 | 0 |

The entries in the columns A and B of Table I represent the slopes two analogue waveforms during concurrent sampling periods. The column A + B shows the resultant slope when the individual slopes A and B are added together. The column A + B in effect represents the vector sum of a number of unit vectors each of which has either one sense or the opposite sense or has zero length. Clearly a summation can be made with respect to any integral number of signals, and the method may be used to form a resultant output regardless of the number of signals.

The pulse generating circuit is constructed to produce a series of ones, a series of zeros, or an alternating series of ones and zeros, dependent upon whether the output of the summing circuit indicates an increasing, decreasing or zero slope respectively.

The slope detectors operate in accordance with the conditions shown in Table II.

TABLE II

| CASE | $t$ | $t+1$ | C | D | Slope |
|---|---|---|---|---|---|
| 1 | 0 | 0 | 0 | 1 | −1 (−Ve) |
| B | 0 | 1 | 0 | 0 | 0 (zero) |
| 3 | 1 | 0 | 0 | 0 | 0 (zero) |
| 4 | 1 | 1 | 1 | 0 | +1 (+Ve) |

The columns $t$ and $t+1$ represent the digits of a delta-modulated input signal at successive time intervals. The resultant output indication of the slope detectors is shown in columns C and D. The "slope" column shows the corresponding slope of the original analogue waveform.

Figure 2:
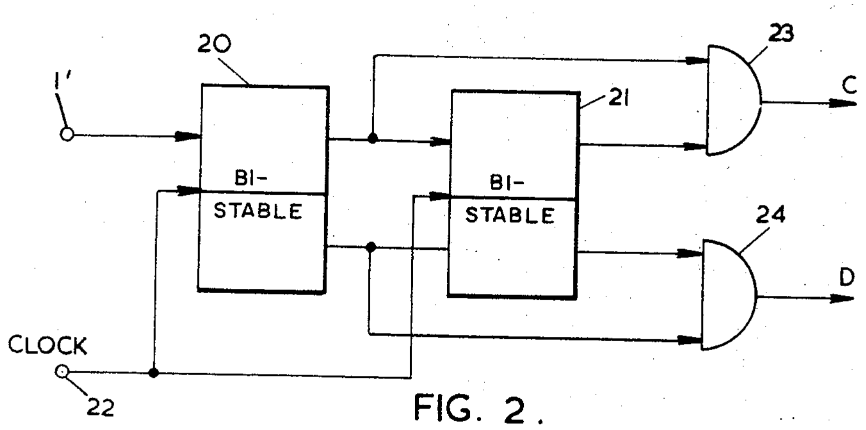
Figure 3:
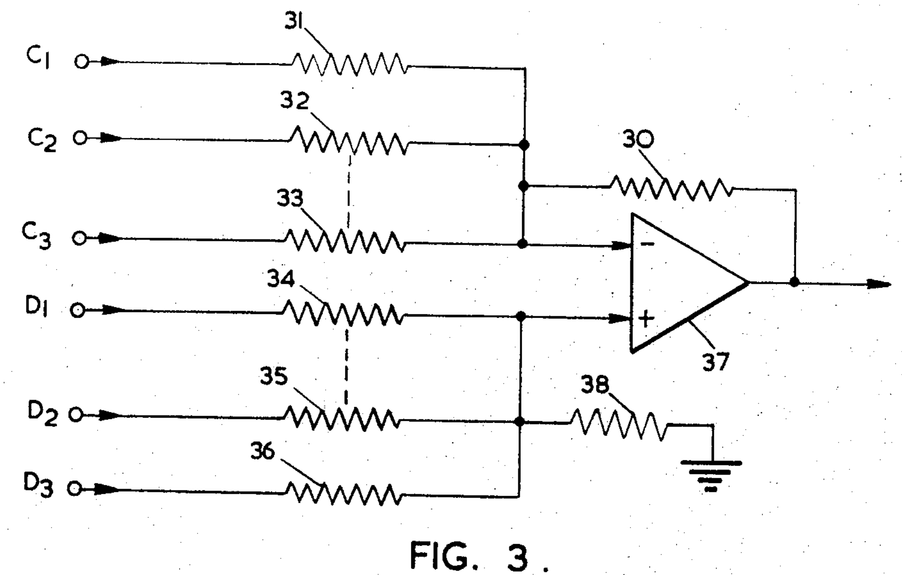
Figure 4:
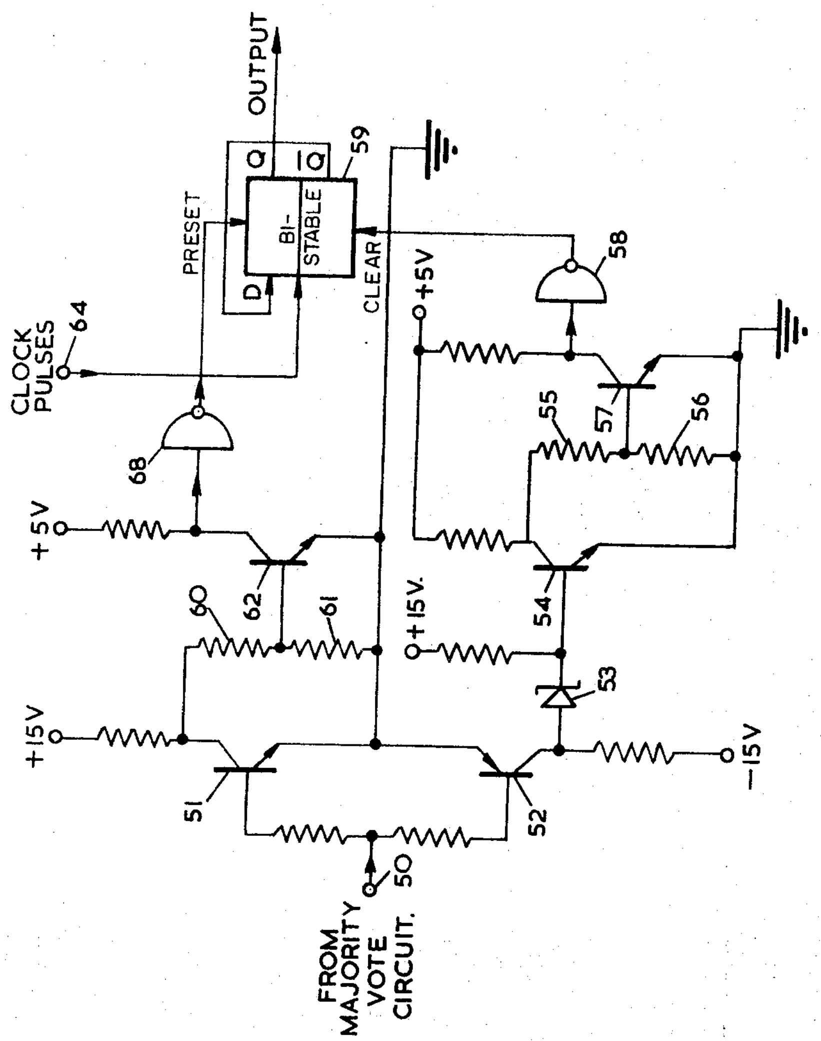
Figure 5:
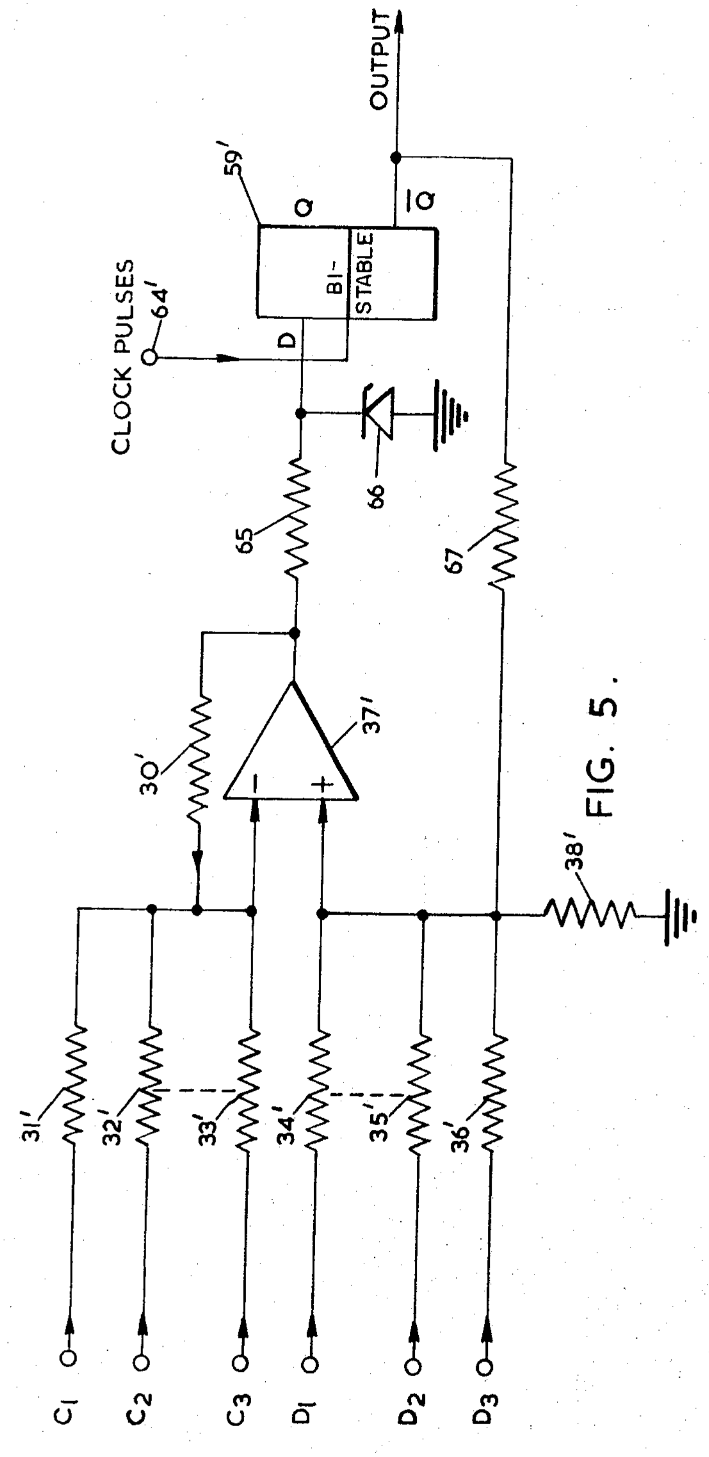

An embodiment of the invention will now be described, by way of example only, with reference to the accompanying drawings of which:

FIG. 1 is a block circuit diagram of a signal combining circuit for a plurality of delta-modulation encoded analogue signals, FIG. 2 is a detailed circuit diagram of a slope detector circuit used in the combining circuit of FIG. 1, FIG. 3 is a circuit diagram of a summing circuit used in the combining circuit of FIG. 1, FIG. 4 is a circuit diagram of a signal-level changing and pulse generating circuit used in the combining circuit of FIG. 1, and FIG. 5 is a combined summing, level-changing and pulse generating circuit which may replace the circuits of FIGS. 3 and 4.

Logic circuitry used in the present example is positive logic in which a binary zero is represented by a positive voltage level of less than a first predetermined voltage (0.7 volts) and a binary one by a positive voltage greater than a second predetermined voltage (4 volts).

FIG. 1 shows delta-modulation encoded signal inputs 1, 2 and 3 connected to inputs of signal slope detectors 4, 5 and 6 respectively. Each of the slope detectors 4, 5 and 6 has a C output and a D output forming outputs C1, D1, C2, D2, C3 and D3 respectively. These outputs are connected to separate inputs of summing circuit 7 whose output is applied to the input of a level changing and pulse generating circuit 8, and the output of the circuit 8 forms the output 9 of the combining circuit.

In operation separate streams of delta-modulation encoded signals, representing independent analogue signals to be combined, are applied to the inputs 1, 2 and 3 respectively. The signal bit periods of the three streams are maintained in synchronism. For each bit period of the incoming signal streams the slope detectors will develop outputs according to Table II depending on the signals occurring simultaneously in their respective signal streams. The summing circuit 7 is arranged to determine the value $$\Sigma C - \Sigma D,$$

that is the algebraic sum of the C outputs of slope detectors minus the algebraic sum of the D outputs of the slope detectors and to indicate whether this value is $$+1, \text{ zero or } -1.$$

The value $$\Sigma C - \Sigma D$$

is the algebraic sum of the slopes of the delta-modulation encoded analogue signals as shown in column 6 of Table II.

The function of the level changing and pulse generating circuit 8 is to convert the 3-level signal at the output of the summing circuit 7 to a binary signal which will be equivalent to a delta-modulation encoded analogue signal whose slope is determined by the output of summing circuit 7. The output of the circuit 8 is arranged to produce a series of ones when the output of the summing circuit indicates a value $$\Sigma C - \Sigma D \geqslant +1$$

and a series of zeros when the output of summing circuit 7 indicates a value of $$\Sigma C - \Sigma D \leqslant -1$$

When the output of the summing circuit 7 indicates a value of zero then the level changing and pulse generating circuit 8 produces alternate ones and zeros.

The operation of the various parts combined in FIG. 1 will now be described in more detail.

FIG. 2 shows a slope detector circuit having a two stage shift register comprising bistable circuits 20 and 21. The register has a data signal input 1 and a clock pulse input 22. An AND-gate 23 has separate inputs connected to the normal outputs of the intermediate and final stages of the shift register. Another AND-gate 24 has separate inputs connected to the complementary outputs of the final and intermediate stages of the shift register. The output of the AND-gate 23 is connected to an output terminal C and the output of the AND-gate 24 is connected to an output terminal D.

Consider firstly the case of a pair of consecutive 0 bit-signals. Such a signal will cause the bistable circuits 20 and 21 to develop 0 on their normal outputs. As a consequence the outputs of AND-gate 23 will develop a 0 valued output at C. Simultaneously, the complementary outputs of the bistable circuits 20 and 21 will assume a value of 1 and the AND-gate 24 will develop an output of 1 at D. This conforms with the first case of Table II indicating that the encoding analogue waveform has a negative slope.

In the second set of conditions shown in Table II the pair of delta-modulated digits at the times $t$ and $t+1$ are 0 and 1 respectively, indicating that the original encoding analogue signal has not changed greatly and may be considered to have a zero slope. Under these conditions the output of the final stage of the register, ie the bistable circuit 21 is still at 0 while the normal output of the intermediate stage has changed to a 1. The output of the AND-gate 23 will therefore remain at 0, but the output of the AND-gate 24 will now be at 0 indicating a zero slope as shown in Table II.

The conditions shown in the fourth case are indicative of a positive slope; the delta-modulated signals at the times $t$ and $t+1$ are both 1, and hence the normal output of both bistable circuits are 1 signals, and consequentially AND-gate 23 produces a 1 output while the AND-gate 24 produces a 0 output.

The summing circuit 7 is shown in greater detail in FIG. 3. The inputs C1, C2 and C3, which are the outputs of slope detector circuits 4, 5 and 6 respectively, are connected to the inverting input of an operational amplifier 37 via resistors 31, 32 and 33 respectively.

The inputs D1, D2 and D3 which are outputs of slope detector circuits 4, 5 and 6 respectively, are connected to the non-inverting input of operational amplifier 37 via resistors 34, 35 and 36 together with an additional resistor 38 whose other end is connected to earth. The output of the operational amplifier forms the output of the summing circuit and has a resistor 30 connected between itself and the inverting input. The resistors 31, 32, 33, 34, 35 and 36 have equal values of R ohms. Resistors 30 and 38 are equal valued with a resistance of $R_f$ ohms. It may be shown that $$(V_{c1} + V_{c2} + V_{c3}) - V_{D1} + V_{D3} + V_{D4}) = R/R_f\ V_o$$

where $V_{c1}$, $V_{c2}$, $V_{c3}$, $V_{D1}$, $V_{D2}$ and $V_{D3}$ are the voltages at C1, C2, C3, D1, D2 and D3 respectively, and $V_D$ is the output voltage of the summing circuit. The operational amplifier 37 is designed to enter saturation at +15 and −15 volts and the ratio of $R_f/R$ is preferably equal to four. It will be seen therefore that if the number of logical 1 signals applied to the inputs C1, C2, C3 exceeds the number of logical 1 signals applied to the inputs D1, D2, D3 the output of operational amplifier 37 will assume a value of −15 volts. When the inputs D1, D2, D3 receive more logical 1 signals than the inputs C1, C2, C3 the output of the operational amplifier will assume a value of +15 volts. If the two sets of inputs receive equal numbers of logical 1 signals, or if all the inputs are zero the operational amplifier will assume a level of 0 volts.

The 3-level signal at the output of the operational amplifier 37 controls the level changing and pulse generating circuit of FIG. 4, which forms appropriate binary signal pulse trains which are the equivalent of a delta-modulation encoded representation of a combination of the original analogue signals.

FIG. 4 shows a signal input 50 connected to complementary common emitter amplifier stages 51 and 52. The output of the amplifier stage 52 is connected via a zener diode 53 to a second common emitter amplifier stage 54. The output of the amplifier stage 54 is connected via a potential divider 55, 56 to a further common emitter amplifier stage 57. The output of the amplifier stage 57 is connected by an inverter circuit 58 to the preset input of a bistable circuit 59. The output of the amplifier stage 51 is connected by a potential divider 60, 61 to a common emitter amplifier stage 62. The output of the amplifier 62 is connected via an inverter circuit 63 to the clear input of the bistable circuit 59. The clock input of the bistable circuit 59 is connected to a clock pulse signal generator 64. The normal output of the bistable circuit 59 forms the signal output of the level changing and pulse generator circuit, while the complementary output $\overline{Q}$ is connected back to its normal D input.

The bistable circuit 59 is connected in an arrangement conventionally known as the D type configuration [see, for example, "Logic Design With Integrated Circuits" by William E. Wickes published by John Wiley at pages 166–167 (Library of Congress Catalogue Card No. 68/21185)] which has the following characteristics. When the preset input and the clear input are both held at the high logic level the level at the D input is transferred to the Q output at the onset of each clock pulse. Thus the Q and $\overline{Q}$ outputs will change their state in response to each clock pulse input. When the preset input is changed to the low logic level (0) whilst maintaining the clear input at a high logic level, the Q output remains at the 1 level. Finally, when the clear input changes to the low logic level and the preset changes to a high logic level the Q output becomes 0 and is maintained at that level while the clear input is at the low level.

When the level of the signal at the input 50 i.e., the signal at the output of the summing circuit; is approximately zero volts the amplifiers 51 and 52 are non-conductive. The potential at the input of the amplifier 62 will therefore be some fraction of the +15 volts supply voltage. The fraction is chosen to maintain the amplifier 62 conductive. The potential at the input of the NAND-gate 63 will be near earth under these conditions and consequentially the level at the preset input of the bistable 59 will be high, ie at the 1 level.

The zener diode 53 is chosen to have a voltage drop of approximately 6 volts. Hence when the amplifier 52 is non-conductive the input of the amplifier 54 will be at approximately −10 volts. As the transistor of the amplifier 54 is of the NPN type it will therefore be non-conductive and the amplifier 57 will be conductive. The input of the NAND-gate 58 is therefore near earth potential and so the clear input of the bistable circuit 59 is at the 1 level. Under these conditions the bistable 59 changes its state each time a clock pulse is applied and so the output is a series of 1's and 0's corresponding to a zero slope in the original encoding waveform and the alternate ones and zeros in the delta-modulated signals.

When the output of the summing circuit 7 swings to +15 volts, indicating a majority of negative slopes, the amplifiers 52 and 54 will be non-conductive and the amplifier 57 will be conductive as before. Hence the clear input of the bistable circuit 59 is maintained at the 1 level. However, the amplifier 51 is now conductive, consequently amplifier 62 is non-conductive and the level at the input of the NAND-gate 63 changes to approximately +5 volts. The output of the NAND-gate 63 changes to the 0 level and maintains the Q output of the bistable circuit 59 to the 0 level. This 0 level is maintained while the output of the summing circuit is at +15 volts. Thus the level changing and pulse generating circuit output represents a delta-modulation encoded form of an analogue signal having a negative slope.

When the output of the summing circuit 7 swings to −15 volts, the amplifiers 51 and 62 are non-conductive and the preset input of the bistable circuit 59 is maintained at the 1 level. The amplifiers 52 and 54 are conductive however and the amplifier 57 is non-conductive. Hence the input of the NAND-gate 58 rises to +15 volts and its output falls to zero volts, the zero level. A 0 level on the preset input of the bistable circuit 59 causes it to maintain its Q output at 1. The 1 level output state is maintained while the output of the summing circuit 7 is at −15 volts and hence a positive slope is indicated. If the ratio of $$R_f/R$$

of the summing circuit were reduced the output would be able to indicate the degree of increase or decrease of slope indicated by the sum of the outputs of the slope detectors and a more complex pulse generator circuit could be used to generate a suitable sequence of output signals. This would require a circuit of greatly increased complexity, but would give an improvement in the quality of the output signal.

FIG. 5 shows a simplified circuit which could replace the summing and level changing and pulse generating circuits of FIGS. 3 and 4. Operational amplifier 37′ is connected in the same configuration as amplifier 37 in FIG. 3 except that an additional resistor 67 is connected between the non-inverting input and a complementary $\overline{Q}$ output of bistable 59′. The output of operational amplifier 37′ is connected to the D input of bistable 59′ and to the cathode of zener diode 66 via a current limiting resistor 65. The anode of zener diode 66 is connected to earth and a clock input of bistable 59′ connected to a clock pulse generator 64′.

Ignoring the effect of resistor 67 on the operation of the circuit, the operational amplifier 37′ will act in the same way as the operational amplifier 37 in FIG. 3 producing an output of +15 volts when the outputs of the slope detector circuits indicate an excess of signals having a negative slope and an output of −15 volts when the outputs of the slope detector circuits indicate an excess of positive slopes. The zener diode 66, which has a zener breakdown voltage of 5 volts, will act in combination with current limiting resistor 65 maintaining the D input of bistable 59′ to either +5 volts or 0 volts, for respective output voltages of +15 or −15 volts from the output of the operational amplifier. This will cause the $\overline{Q}$ output of bistable 59′ to produce a series of zeros or ones respectively, as hereinbefore described for the case of the circuit of FIG. 4. The resistance of resistor 67 is chosen to ensure overall feedback to the operational amplifier so that an idle pattern of alternate ones and zeros will be produced when the outputs of the slope detectors indicate equal numbers of positive and negative slopes, or all zero slopes, but it must have a sufficiently large value so as not to interfere with the operation of the circuit when an excess of positive or negative slopes is indicated.

I claim:

1. A signal combiner, for combining a plurality of delta-modulation encoded representations of analogue signals to form an equivalent of a delta-modulation encoded representation of a combination of the analogue signals, which includes a plurality of concurrently operative slope detector circuit means for deriving an output signal representing a slope of a separate one of the analogue signals from a comparison of two or more consecutive bit signals in its delta-modulation encoded representation, summing circuit means for receiving the output of the slope detector circuit means and for deriving an output dependent on the sum of the slopes represented by the said output signals, and pulse generating circuit means, controlled by the output of the summing circuit, for generating pulse sequences to form a stream of signals equivalent to a delta-modulation encoded representation of an analogue signal having a slope indicated by the instantaneous output of the summing circuit means.

2. A signal combiner as claimed in claim 1 and wherein each slope detector circuit means comprises means for comparing consecutive bit-signals in a delta-modulation encoded representation of an analogue waveform and to provide a signal indicating a positive slope if both bit signals are ones, to provide a signal indicating a negative slope if both bit signals are zeros, and to provide a signal indicating a zero slope if the bit signals are complementary.

3. A signal combiner as claimed in claim 1 and wherein the summing circuit means is for deriving an output signal indicating the algebraic sum of the outputs of the slope detector means, when increasing, decreasing and zero slopes are assigned the values unity positive, unity negative or zero respectively.

4. A signal combiner as claimed in claim 1 and wherein the summing circuit means comprises means for deriving an output signal indicating an increasing slope if a greater number of slope detector means indicate the presence of signals with an increasing slope than those with a decreasing slope, a decreasing slope if the outputs of the slope detector means indicate the presence of a greater number of signals with a decreasing slope than those with an increasing slope, and zero slope if the outputs of the slope detector means indicate an equal number of signals having increasing and decreasing slopes.

5. A signal combiner as claimed in claim 4 wherein the pulse generator circuit means comprises means for producing a series of ones, a series of zeros, or a series of alternating ones and zeros, dependent upon whether the output of the summing circuit means indicates an increasing, decreasing or zero slope respectively.

* * * * *